ately available for reading thereof, the reproduction or

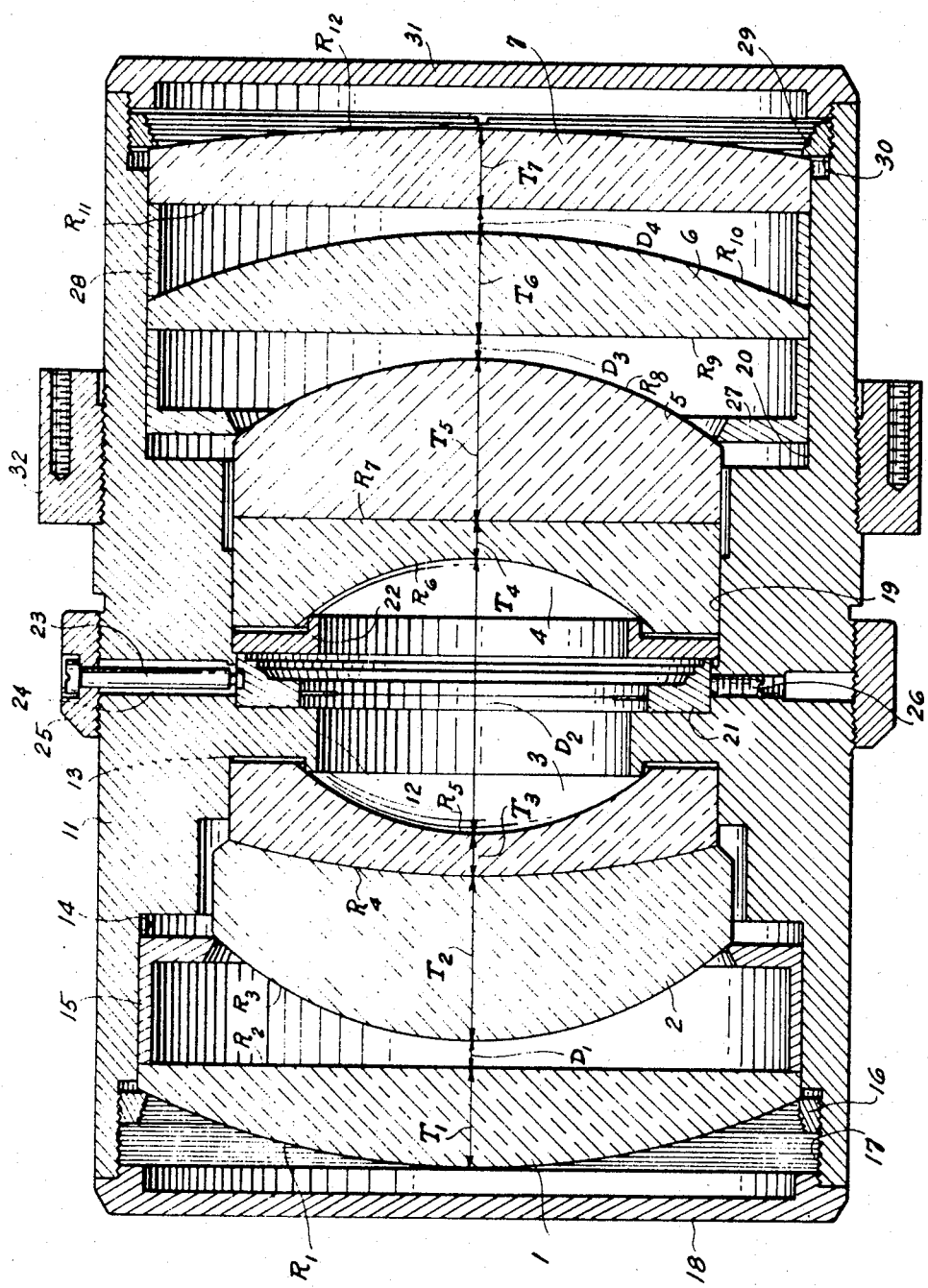

United States Patent Office 3,458,250
Patented July 29, 1969

3,458,250
SEVEN-ELEMENT LENS SYSTEM FOR ELECTROPHOTOGRAPHIC REPRODUCTION OF FLUORESCENT IMAGES
Edwin W. Bechtold, Middle Village, N.Y., assignor to The Ednalite Corporation, Peekskill, N.Y., a corporation of New York
Filed Apr. 22, 1965, Ser. No. 450,034
Int. Cl. G02b 9/60
U.S. Cl. 350—217
2 Claims

ABSTRACT OF THE DISCLOSURE

A seven-element lens system for electrophotographic reproduction of fluorescent images consists of two identical plano-convex lens elements, two cemented doublets having free surfaces of the same curvatures and being disposed between the identical plano-convex lens elements, and an additional plano-convex lens element at the rear or exit end of the system, with the refractive and dispersive indices of such lens elements being according to the inequalities $$1.5725 < N_1 = N_2 = N_5 = N_6 = N_7 < 1.810$$
$$46.8 < V_1 = V_2 = V_5 = V_6 = V_7 < 60.5$$
$$1.575 < N_3 = N_4 < 1.805$$
$$25.5 < V_3 = V_4 < 41.0$$

where N is the index of refraction of the glasses for D light, V is the reciprocal dispersion ratio or Abbe number of the glasses and the subscripts denote the lens elements numbered consecutively from front to rear.

---

This invention relates to a new and improved lens system particularly adapted for use in the electrophotographic reproduction of fluorescent images which are displayed for extremely limited times, for example, of the order of 1/1000 sec.

Electronic communication devices and computers transmit information or bring forth results in the form of characters, numerals or symbols that are to be printed or recorded on paper or the like. In view of the very high speeds achieved by the electronic communication devices and computers, the transmitted information or results cannot be printed or recorded by relatively slower acting mechanical means, such as, electric typewriters or line printers, without adversely affecting the efficiency of the installation. Accordingly, it has been proposed to provide, as the output component of the communication device or computer, an electronic tube, for example, of the type developed by the Stromberg-Carlson Co. and referred to as a Charactron Tube. Such tube has an internal matrix or mask having apertures which define characters, numerals or symbols, an electron beam is suitably controlled in response to the transmitted information or computed result to scan the matrix and to display fluorescent images of the selected characters, numerals or symbols on a screen which may have a diameter of 5 to 7 inches. The fluorescent images displayed on the screen are photographically reproduced or recorded. In order to permit the recorded characters, numerals or symbols to be immediately available for reading thereof, the reproduction or recording thereof is effected electrophotographically, for example, by xerography, in which case developing and fixing of the images projected onto the recording paper are effected continuously at sufficient speed to keep pace with the advancement of the paper.

In view of the extremely limited time during which the fluorescent images are displayed, which is of the order of 1/1000 sec., and the relatively low sensitivity electrophoto-sensitive recording paper, it is necessary to provide a lens system of highest possible speed, for example, having a maximum aperture ratio of F:2, for projecting the fluorescent images onto the recording paper. A lens system suitable for the described purposes should have a ratio of projected image to object of 1½ to 2½:1, as the distance across the xerographic or other electrophoto-sensitive recording paper is approximately two times as large as the diameter of the screen at which the fluorescent images are displayed, and the lens system should be corrected, as to aberration, for the corresponding relatively short focus distance. Since the electrophoto-sensitive recording paper has very limited latitude with respect to correct exposure thereof, the lens system must provide uniform intensity of illumination over the entire image field. Further, resolution of the lens system must be at least as good over the entire image field as the resolution of the screen at which the fluorescent images are displayed, for example, a resolution of at least 20 lines per mm.

Although lens systems have been provided to satisfy the above requirements, such existing lens systems comprise a large number, for example, 7 or 8, lens elements which are dissimilar and have large numbers of differently curved refracting surfaces resulting in high production costs by reason of the tooling and test glasses required therefor.

Accordingly, it is an object of the invention to provide a relatively inexpensive lens system assembly which satisfies the above mentioned requirements for use in the electrophotographic reproduction of fluorescent images displayed for very limited times.

In accordance with an important aspect of this invention, a lens system or assembly for use in the electrophotographic reproduction of fluorescent images comprises seven lens elements which are designed and arranged to have numerous plane surfaces and other refracting surfaces with the same curvature thereby to reduce the tooling and test glasses required for production and consequently to greatly decrease the cost of the lens system.

The above, and other objects, features and advantages of the invention, will be apparent in the following detailed description of an illustrative embodiment thereof which is to be read in connection with the accompanying drawing having, as its single view, an axial sectional view of the lens assembly.

Referring to the drawing in detail, it will be seen that a lens assembly 10 embodying this invention consists of seven lens elements 1, 2, 3, 4, 5, 6 and 7. The plano-convex lens elements 1 and 6 are identical, and the cemented lens elements 2 and 3 constituting one doublet have free or outer surfaces of the same curvature as the free or outer surfaces of the other doublet formed by cemented lens elements 4 and 5. When the cemented surfaces of elements 4 and 5 are planar, as shown, the assembly 10 has five planar surfaces and the remaining nine curved surfaces have only five different curvatures, thereby facilitating tooling for the grinding of such surfaces and reducing the number of test glasses that are required.

I have found that the desired results can be achieved with a lens assembly having the above manufacturing economies only when the refractive and dispersive indices of the lens elements, the radii of curvature at the refractive surfaces and the reduced thicknesses of the lens elements and air spaces therebetween are within the following ranges:

Refractive and dispersive indices $$1.5725 < N_1 = N_2 = N_5 = N_6 = N_7 < 1.810$$
$$46.8 < V_1 = V_2 = V_5 = V_6 = V_7 < 60.5$$
$$1.575 < N_3 = N_4 < 1.805$$
$$25.5 < V_3 = V_4 < 41.0$$

where N is the index of refraction of the glasses for D light, that is, the D line of the spectrum, V is the dispersive index of the glasses and the subscripts denote the lenses numbered consecutively from the front to rear of the lens system or assembly.

In any case, in selecting glasses from the above ranges, the difference between the refractive indices of the crown, that is, the lenses 1, 2, 5, 6 and 7, and of the flint, that is, the lenses 3 and 4, must be no greater than .01, whereas the ratio of the dispersive index of the crown to the dispersive index of the flint must be in the range between approximately 1.4:1 and 1.7:1.

Radii of curvature $+.624F\ R_1<+.762F$
$R_2=\infty$
$+.312F\ R_3<+.381F$
$+.80F\ R_4<+1.1F$
$+.208F\ R_5<+.254F$
$-.208F\ R_6<-.254F$
$-9.0F\ R_7>\pm9.0F$
$=.312F\ R_8<-.381F$
$R_9=\infty$
$-.624F\ R_{10}<=.762F$
$R_{11}=\infty$
$-1.6F\ R_{12}<-3.2F$ where F is the equivalent focal length of the lens system, R is the radius of curvature of each refractive surface, the subscripts denote the surfaces numbered consecutively from the front to the rear of the lens system, positive values of radius denote surfaces that are convex to the front and negative values of radius denote surfaces that are concave to the front.

In preferred embodiments of the invention, the radii of curvature $R_1$, $R_3$ and $R_5$ and the radii of curvature $R_{10}$, $R_8$ and $R_6$ are substantially in the ratio 1:1/2:1/3.

Reduced thicknesses $.07F<(T_{1N/1}+D_1)<.09F$
$.10F<(T_{2/N_2}+T_{3/N_3})<.125F$
$.23F<(D_2<.276F$
$.10F<(T_{4/N_4}+T_{5/N_5})<.125F$
$.07<(D_3+T_{6/N_6})<.09F$
$.06F<(D_4+T_{7/N_7})<.10F$ where T is the axial thickness of each lens, D is the axial air space between lens elements, and the subscribs denote the lens and air spaces numbered consecutively from the front to the rear of the lens system.

A preferred embodiment of the invention is constructed in proportions substantially as specified in the following table:

TABLE I

| Lens | Radii | Thicknesses and Air Spaces | N | V |
|---|---|---|---|---|
| 1 | $R_1=+.693F$ | $T_1=.0906F$ | 1.62031 | 60.3 |
|   | $R_2=\infty$ | $D_1=.0223F$ | Air | |
| 2 | $R_3=+.347F$ | $T_2=.147F$ | 1.62031 | 60.3 |
|   | $R_4=+.932F$ | | | |
| 3 | $R_5=+.228F$ | $T_3=.0335F$ | 1.61992 | 36.3 |
|   | $R_6=-.228F$ | $D_2=.253F$ | Air | |
| 4 | $R_7=\infty$ | $T_4=.0335F$ | 1.61992 | 36.3 |
| 5 | $R_8=-.347F$ | $T_5=.147F$ | 1.62031 | 60.3 |
|   | $R_9=\infty$ | $D_3=.0223F$ | Air | |
| 6 | $R_{10}=-.693F$ | $T_6=.0906F$ | 1.62031 | 60.3 |
|   | $R_{11}=\infty$ | $D_4=.0223F$ | Air | |
| 7 | $R_{12}=-2.16F$ | $T_7=.0725F$ | 1.62031 | 60.3 | where F is the equivalent focal length of the system, the first column gives the lens elements numbered in order from the front to the rear, and R, T, D, N and V, and the several subscripts all have the previously indicated meanings.

In a specific example of the invention having an effective focal length of 134.04 mm., the lens system or assembly has the numerical data substantially as follows:

TABLE II

| Lens | Radii (mm.) | Thicknesses and Air Spaces (mm.) | N | V |
|---|---|---|---|---|
| 1 | $R_1=+93.0$ | $T_1=12.15$ | 1.62031 | 60.3 |
|   | $R_2=\infty$ | $D_1=3.0$ | Air | |
| 2 | $R_3=+46.5$ | $T_2=19.8$ | 1.62031 | 60.3 |
|   | $R_4=+125.0$ | | | |
| 3 | $R_5=+30.686$ | $T_3=4.5$ | 1.61992 | 36.3 |
|   | $R_6=-30.686$ | $D_2=34.0$ | Air | |
| 4 | $R_7=\infty$ | $T_4=4.5$ | 1.61992 | 36.3 |
| 5 | $R_8=-46.5$ | $T_5=19.8$ | 1.62031 | 60.3 |
|   | $R_9=\infty$ | $D_3=3.0$ | Air | |
| 6 | $R_{10}=-93.0$ | $T_6=12.15$ | 1.62031 | 60.3 |
|   | $R_{11}=\infty$ | $D_4=3.0$ | Air | |
| 7 | $R_{12}=-290.07$ | $T_7=9.72$ | 1.62031 | 60.3 |

The foregoing example is corrected for aberration at 4360 A. which is perfectly suitable as this corresponds substantially to the wavelength of the fluorescent images which are to be projected onto the electrophoto-sensitive paper.

As shown on the drawing, a preferred mounting structure for the lens assembly 10 includes a cylindrical barrell 11 which, intermediate its opposite ends, has an inwardly directed radial flange 12 against one side of which the meniscus lens 3 is seated. The barrel 11 has an internal cylindrical surface 13 extending from flange 12 to radially guide the meniscus lens 3, and hence to also radially guide the meniscus lens 2 which is cemented to lens 3 to form one of the doublets. Barrel 11 further has an internal cylindrical surface 14 of increased diameter disposed between cylindrical surface 13 and the adjacent end of barrel 11 to radially guide the plano-convex lens 1, and an annular lens separator 15 is interposed between lenses 1 and 2 and also radially guided by surface 14 to establish the air space $D_1$ therebetween. A retainer ring 16 screwed into internal threads 17 formed in the end portion of barrel 11 engages lens 1 and thus holds the latter and the doublet 2, 3 within barrel 11. A removable lens cap 18 may also be engaged with the threads 17 to protect the adjacent lens surface $R_1$ during transport and installation of the lens assembly.

At the side of flange 12 opposed to the cylindrical surface 13, barrel 11 has a stepped inner surface including a cylindrical surface 19 and an increased diameter cylindrical surface 20. An iris diaphragm 21, for example, of a type that is commercially available from Edmund Scientific Comany, Barrington, N.J., as part No. 30,118, is located within barrel 11 between flange 12 and an annular spacer 22 which is radially guided by cylindrical surface 19. The iris 21 is manually adjustable, for example, between f/2 and f/11, by means of a stud 23 extending radially therefrom through a circumferential slot 24 in barrel 11 to an iris adjusting ring 25 which is turnable on the outer surface of the barrel. A set s crew 26 also extends through barrell 11 and is engageable with the iris 21 to lock the latter within the barrel.

The cemented together plano-concave lens 4 and plano-convex lens 5 are received and guided within cylindrical surface 19, and the front surface of lens 4 engages spacer 22 so that the flange 12, iris 21 and spacer 22 determine the axial dimension of the air space $D_2$. The plano-convex lenses 6 and 7 are both radially guided in cylindrical surface 20 with an annular spacer 27 being interposed between lenses 5 and 6 to determine the air space $D_3$ and an annular spacer 28 being interposed between lenses 6 and 7 to determine the air space $D_4$. The doublet 4, 5, lens 6 and lens 7 are all locked in fixed positions within barrel 11 by means of a retaining ring 29 screwed into internal threads 30 formed in barrel 11 adjacent the back end thereof. The threads 30 can further receive a removable lens cap 31 for protecting lens surface $R_{12}$ during transport and installation. A mount ring 32 may be screwed onto external threads of barrel 11 to provide means by which the barrel 11 may be supported from a suitable mounting bracket (not shown).

It will be seen that, in the above described mount for the lens assembly 10 embodying this invention, the doublet 2, 3 and lens 1 are inserted into barrel 11 from one end of the latter and located off machined surfaces at one side of flange 12, whereas the doublet 4, 5 and lenses 6 and 7 are inserted through the opposite end of barrel 11 and also located off machined surfaces at the corresponding side of flange 12. Thus, the seven lens elements constituting the assembly embodying this invention are not located by build-up from one end of the barrel 11 and the necessary accurate assembly of the several lens elements is facilitated.

Although an illustrative embodiment of this invention has been described in detail herein with reference to the accompanying drawing, it is to be understood that the inventon is not limited to that precise embodiment, and that various changes and modifications may be effected therein by one skilled in the art without departing from the scope or spirit of the invention.

What is claimed is:

1. A seven element lens system constructed substantially according to the specifications in the following table:

| Lens | Radii | Thicknesses and Air Spaces | N | V |
|---|---|---|---|---|
| 1 | $R_1=+.693F$ | $T_1=.0906F$ | 1.62031 | 60.3 |
|   | $R_2=\infty$ | $D_1=.0223F$ | Air |  |
| 2 | $R_3=+.347F$ | $T_2=.147F$ | 1.62031 | 60.3 |
|   | $R_4=+.932F$ |  |  |  |
| 3 |   | $T_3=.0335F$ | 1.61992 | 36.3 |
|   | $R_5=+.228F$ | $D_2=.253F$ | Air |  |
|   | $R_6=-.228F$ |  |  |  |
| 4 | $R_7=\infty$ | $T_4=.0335F$ | 1.61992 | 36.3 |
| 5 |   | $T_5=.147F$ | 1.62031 | 60.3 |
|   | $R_8=-.347F$ | $D_3=.0223F$ | Air |  |
|   | $R_9=\infty$ |  |  |  |
| 6 |   | $T_6=.0906F$ | 1.62031 | 60.3 |
|   | $R_{10}=-.693F$ | $D_4=.0223F$ | Air |  |
|   | $R_{11}=\infty$ |  |  |  |
| 7 |   | $T_7=.0725F$ | 1.62031 | 60.3 |
|   | $R_{12}=-2.16F$ |  |  |  | where F is the equivalent focal length of the lens system, the first column denotes the lens elements numbered in order from front to rear, R is the radius of curvature of each refractive surface, with the plus and minus values denoting surfaces that are respectively convex and concave to the front, T is the axial thickness of each lens element, D is the axial air space between lens elements, N and V denote the refractive and dispersive indices for the lens elements, and each category is numbered by subscripts from front to rear.

2. A seven element lens system having an effective focal length of 134.04 mm. and numerical data substantially as follows:

| Lens | Radii (mm.) | Thicknesses and Air Spaces (mm.) | N | V |
|---|---|---|---|---|
| 1 | $R_1=+93.0$ | $T_1=12.15$ | 1.62031 | 60.3 |
|   | $R_2=\infty$ | $D_1=3.0$ | Air |  |
| 2 | $R_3=+46.5$ | $T_2=19.8$ | 1.62031 | 60.3 |
|   | $R_4=+125.0$ |  |  |  |
| 3 |   | $T_3=4.5$ | 1.61992 | 36.3 |
|   | $R_5=+30.686$ | $D_2=34.0$ | Air |  |
|   | $R_6=-30.686$ |  |  |  |
| 4 | $R_7=\infty$ | $T_4=4.5$ | 1.61992 | 36.3 |
| 5 |   | $T_5=19.8$ | 1.62031 | 60.3 |
|   | $R_8=-46.5$ | $D_3=3.0$ | Air |  |
|   | $R_9=\infty$ |  |  |  |
| 6 |   | $T_6=12.15$ | 1.62031 | 60.3 |
|   | $R_{10}=-93.0$ | $D_4=3.0$ | Air |  |
|   | $R_{11}=\infty$ |  |  |  |
| 7 |   | $T_7=9.72$ | 1.62031 | 60.3 |
|   | $R_{12}=-290.07$ |  |  |  | where the first column denotes the lens elements numbered in order from front to rear, R is the radius of curvature of each refractive surface, with the plus and minus values denoting surfaces that are respectively convex and concave to the front, T is the axial thickness of each lens element, D is the axial air space between lens elements, N and V denote the rafractive and dispersive indices for the lens elements, and each category is numbered by subscripts from front to rear.

References Cited

UNITED STATES PATENTS 2,959,102   11/1960   Cook _____ 350—217 X

FOREIGN PATENTS 647,830   7/1937   Germany.

JOHN K. CORBIN, Primary Examiner

U.S. Cl. X.R.

350—252